United States Patent [19]
Wheeler

[11] Patent Number: 5,666,442
[45] Date of Patent: Sep. 9, 1997

[54] COMPARISON SYSTEM FOR IDENTIFYING THE DEGREE OF SIMILARITY BETWEEN OBJECTS BY RENDERING A NUMERIC MEASURE OF CLOSENESS, THE SYSTEM INCLUDING ALL AVAILABLE INFORMATION COMPLETE WITH ERRORS AND INACCURACIES

[75] Inventor: David Brian Wheeler, Austin, Tex.

[73] Assignee: InfoGlide Corporation, Austin, Tex.

[21] Appl. No.: 535,783

[22] Filed: Sep. 28, 1995

Related U.S. Application Data

[63] Continuation of Ser. No. 67,745, May 23, 1993, abandoned.

[51] Int. Cl.$^6$ .................................................. G06F 17/30
[52] U.S. Cl. ............................................ 382/209; 395/603
[58] Field of Search ........................................ 382/209, 224, 382/227, 228; 364/282.1, 283.1, 283.3, 963, 963.1, 974; 395/600, 934, 62, 603, 604, 605, 607, 614

[56] References Cited

U.S. PATENT DOCUMENTS

| | | | |
|---|---|---|---|
| 4,135,147 | 1/1979 | Riganati et al. | 340/146.3 E |
| 4,905,162 | 2/1990 | Hartzband et al. | 364/513 |
| 5,140,538 | 8/1992 | Bass et al. | 364/602 |
| 5,224,173 | 6/1993 | Kuhns et al. | 382/2 |
| 5,237,627 | 8/1993 | Johnson et al. | 382/30 |
| 5,295,198 | 3/1994 | Maney | 382/38 |
| 5,313,527 | 5/1994 | Guberman et al. | 382/13 |
| 5,388,259 | 2/1995 | Fleischman et al. | 395/600 |
| 5,404,507 | 4/1995 | Bohm et al. | 395/600 |
| 5,450,504 | 9/1995 | Calia | 382/118 |

*Primary Examiner*—Andrew Johns
*Attorney, Agent, or Firm*—Bell, Seltzer, Park & Gibson, P.A.

[57] ABSTRACT

A data comparison system includes a database containing target object information which is compared with an individual source object, defined by the user. Computer systems known in the art are utilized to hold the assembled target object database including all information that is available, complete with errors, inaccuracies, and so forth. This database is searched and the computer sorts the information after comparison so that target objects are sorted based on the degree of similarity with the source object.

Both target and source objects are defined by object types, components of each object type, subjects of each component, and at least one answer, that is language independent, for each subject. That is, statements may be received and entered in any language and the data derived therefrom, however, is language independent so that the results can be universally applied.

Further, the source object can, as will naturally be the case, be comprised of incomplete and partial object descriptions of components, subjects, and answers. Importantly, the system of the present invention further comprises a link for each object, component, and subject so that the objects, components, and subjects are uniquely identified within the database.

The system of the present invention uses almost all information available, complete with errors and inaccuracies, to identify similarities between objects and/or events quickly and efficiently. Since more of the information is used in the search, and an exact match is not the goal, the results are more accurate and, therefore, more useful. As a result, analysts can use the resulting list of objects or events, ordered by degree of similarity, to the object or event in questions, to focus their identification efforts.

10 Claims, 10 Drawing Sheets

|  |  | OBSERVER 1 MAY 1, 1993 | OBSERVER 2 MAY 1, 1993 |
|---|---|---|---|
| PHYSICAL DESCRIPTION | SEX | MALE | MALE |
|  | HEIGHT | 6'2"–6'4" | 6'0"–6'2" |
|  | WEIGHT | 165LBS–175LBS | 150LBS–170LBS |
|  | EYE COLOR |  | BROWN |
|  | FACIAL MARKS | MOLE |  |
| WEAPON 1 | WEAPON TYPE | HAND GUN | HAND GUN |
|  | HAND GUN TYPE | REVOLVER | REVOLVER |
|  | HAND GUN COLOR | BLUE STEEL | BLUE STEEL |
|  | HAND GUN SIZE | LARGE FRAME | LARGE FRAME |
| WEAPON 2 | WEAPON TYPE | KNIFE |  |
|  | KNIFE TYPE | BUTCHER |  |
|  | BLADE LENGTH | 10"–12" |  |

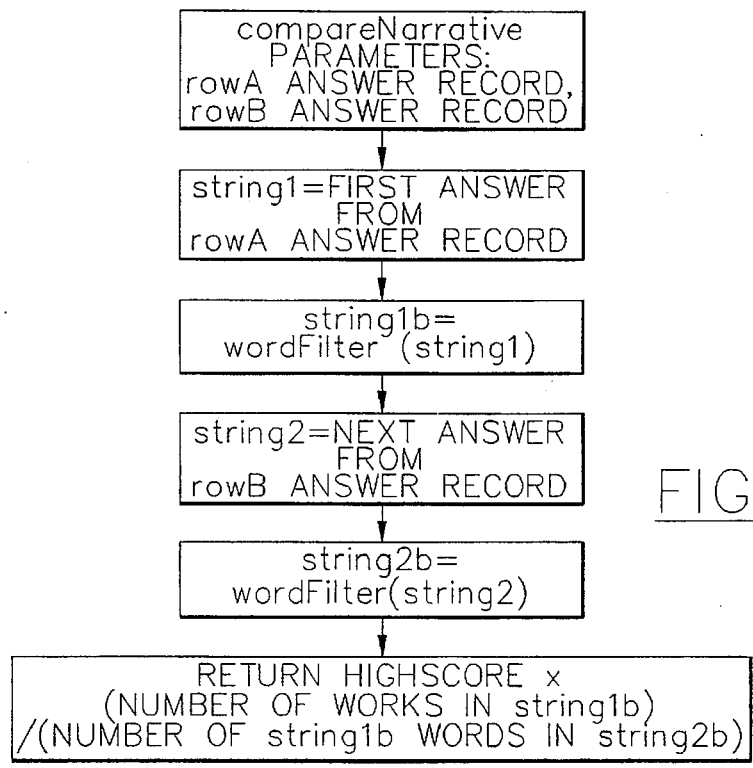

FIG. 13A.
FIG. 13B.
objectScore TABLE (AFTER)
| objectLink | 1 | 2 | 3 | ... | 15 | ... | | | | | | | | | |
|---|---|---|---|---|---|---|---|---|---|---|---|---|---|---|---|
| SCORE | | | | | 1.9 | | | | | | | | | | |
FIG. 13C.

COMPARISON SYSTEM FOR IDENTIFYING THE DEGREE OF SIMILARITY BETWEEN OBJECTS BY RENDERING A NUMERIC MEASURE OF CLOSENESS, THE SYSTEM INCLUDING ALL AVAILABLE INFORMATION COMPLETE WITH ERRORS AND INACCURACIES

This application is a continuation of application Ser. No. 08/067,745, filed May 23, 1993, now abandoned.

BACKGROUND OF THE INVENTION

This invention relates to a system of data comparison for identifying the degree of similarity between objects.

Both manually and automatically operated devices have been known in the art for quite some time that are utilized for the comparison of a selected source piece of data with assembled target data. There are classic problems for which the goal is to match events and/or objects, for example police and fire investigations. Police detectives attempt to identify the person responsible for committing a crime. An arson investigator attempts to identify the person responsible for setting a fire, and so forth. In these instances, and others, the investigator must make the identification using information that is incomplete or inaccurate. Unfortunately, existing manual and automated systems have assumed that the information provided is correct. Further, they use only a very limited subset of the information available and typically search computer-based tables for exact matches. With existing systems, a single error or inaccuracy normally results in a failed search. Since the chance of including an error or inaccuracy increases as the percentage of the data used for the search increases, existing systems use only a very limited subset of the information available for the search. Since the assumption for this class of problems is incorrect to begin with, i.e. that the information is accurate, the results have been so poor that automated systems based upon these assumption are often ignored in favor of a time consuming, costly, tedious, and severely limited manual search. Thus, there is a need in the art for providing a system of data comparison that uses all the information available, including errors and inaccuracies, and provides a sorting and comparison of that data based on the degree of similarity with the source of the search. It, therefore, is an object of this invention to provide an improved system for data comparison that compares source objects with target objects in a database and provides an ordered list of target objects that most closely match the source object.

SHORT STATEMENT OF THE INVENTION

Accordingly, the data comparison system of the present invention includes a database containing target object information which is compared with an individual source object, defined by the user. Computer systems known in the art are utilized to hold the assembled target object database including all information that is available, complete with errors, inaccuracies, and so forth. This database is searched and the computer sorts the information after comparison so that target objects are sorted based on the degree of similarity with the source object.

Both target and source objects are defined by object types, components of each object type, subjects of each component, and at least one answer, that is language independent, for each subject. That is, statements may be received and entered in any language and the data derived therefrom, however, is language independent so that the results can be universally applied.

Further, both the source and target objects may, as will naturally be the case, be comprised of incomplete and partial object descriptions of components, subjects, and answers. Importantly, the system of the present invention further comprises a link for each object, component, and subject so that the objects, components, and subjects are uniquely identified within the database.

In summary, the system of the present invention uses almost all information available, complete with errors and inaccuracies, to identify similarities between objects and/or events quickly and efficiency. Since more of the information is used in the search, and an exact match is not the goal, the results are more accurate and therefore more useful. As a result, analysts can use the resulting list of objects or events, ordered by degree of similarity to the object or event in question, to focus their identification efforts.

BRIEF DESCRIPTION OF THE DRAWINGS

Other objects, advantages, and features of the present invention will become more fully apparent from the following detailed description of the preferred embodiment, the appended claims and the accompanying drawings in which:

FIG. 11 is a flow chart illustrating how narrative answers are compared;

FIG. 12 is an object score and component table scoring table; and

FIG. 13 is component/score and an object scoring illustration.

DETAILED DESCRIPTION OF THE PREFERRED EMBODIMENT

The preferred embodiment of the present invention is illustrated by way of example in FIG. 1–13. With specific reference to FIGS. 1 and 2, an illustration of the organization of the information of the invention is provided. As is known in the art, often measurements are made without scientific instruments and are, therefore, likely to contain substantial errors. Additionally, two observations of the same object, separated in time by several years, often results in different descriptions as the object ages. The present invention describes a system, appropriate for computing machinery known in the art, which compares objects or events (hereafter simply referred to as objects) and provides a measure of their degree of similarity. Analysts attempting to identify an object may use this information to focus on the most likely candidate/suspect.

Figures 1, 2:
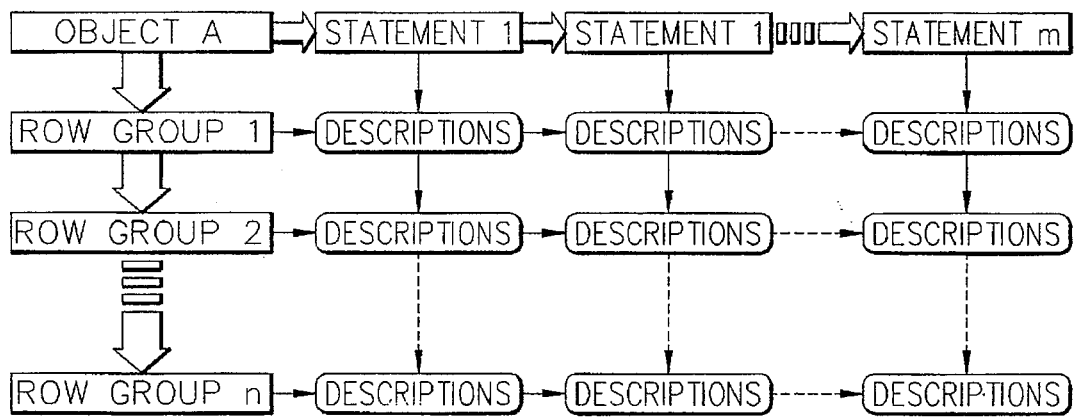
FIG. 1 is an illustration of a sheet used to provide one or more descriptions of an object.
FIG. 2 is a block diagram illustrating the relationship between items listed on the sheet in FIG. 1, i.e., row groups, statements, answers, subjects, and questions.

Referring specifically to FIG. 1, structured descriptions are referred to as a "sheet." Each sheet, as shown in FIG. 1, provides one or more descriptions of an object. Because a sheet is used to describe an object, the terms sheet and object are used interchangeably.

Many features of the sheet have a one to one correspondence with an element of the operation of the present invention. Questions, which are not shown in the sheet, are answered by one or more observers. The collection of answers given by an observer at any particular time is called a statement and is represented by a column in the sheet in FIG. 1.

Each question addresses a particular subject, which is represented by a single row in the sheet in FIG. 1. The answer cell at the intersection of a row and a column is a single observer's answer(s) to a single question. Some questions, such as in a check list, allow the observer to select more than one answer, as will be more fully described hereafter.

Every row belongs to a row group. Row groups are the components of an object and the terms are used interchangeably. In FIG. 1, the observers are victims of a crime and the row groups are characteristics of the criminal who committed the crime. In this instance there is one row group for physical description (because there is only one criminal in this example) and there are two other row groups; one for each of his weapons.

Statements provided in this sheet are ordered by date, so that answers in the last column farthest to the fight, are the most recent. By setting the invention parameters to "use last answer" in the subject table, described more fully hereafter, to "true," all comparisons for the subject will use the most recent (right-most) answer for any comparisons. If "use last answer" is false, all answers are considered equally valid (except as adjusted by each answer's confidence factor, again, described-more fully hereafter).

In the sheet shown in FIG. 1, neither observer answers all questions and, in fact, there may be many questions that both are unable to answer. Sometimes, as in the height and weight answers shown in FIG. 1, the observers may disagree. This is a typical result of measurement by simple observation, without the aid of devices such as rulers, scales, or standardized lighting, for example.

Over time objects usually change, so if there is a significant time difference between observations, disagreements between observers should be expected. However, other observations may be made by scientific measurements. This would provide a standard of known objects for comparison.

The following tables are collectively referred to as the database. A single row in a table is sometimes referred to as a record. Each table has one primary key and optionally one or more alternate keys. The primary key determines the physical order of the table. The present invention requires the following tables to function adequately:

sheet definition
sheet instance
subject
question
row group
row group definition
statement
answer
unit The database has a structure which determines the efficiency of various operations performed with it. The organization just described was chosen to minimize the time and effort involved in calculating degrees of similarity. Just three tables, subject, answer, and row group are required for this calculation. The subject table indicates which scoring method is required and the answer table contains the values to be scored, and the row group table allows component scores to be totaled for the objects.

Referring now to FIG. 2, the sheet, row group, statement, answer, subject, and question tables are all required to locate and format answers for a sheet. To understand the relationship between these tables, the FIG. 2 diagram is considered. The database contains a statement table, which corresponds to a single column in the sheet. The row group table, named because each entry represents a group of one or more rows, are components of objects. Row groups have a predefined type and are contained in a pre-specified collection of rows (subjects). In the sample sheet shown in FIG. 1, there were two row group types; physical description and weapon.

As FIG. 2 illustrates, an object is described by one or more row groups. Some objects have more than one instance of a particular row group type (again, refer to the two weapons from FIG. 1). Each row group instance is given an identifying number which is unique for its particular row group type. Row groups allow for comparison of objects with differing numbers of any particular type of component, such as when a crime with one suspect is compared to a crime with three suspects. Importantly, the present invention determines which of the three suspects best matches the single suspect and uses that score in the calculation of the degree of similarity between the two cases.

Figure 3:
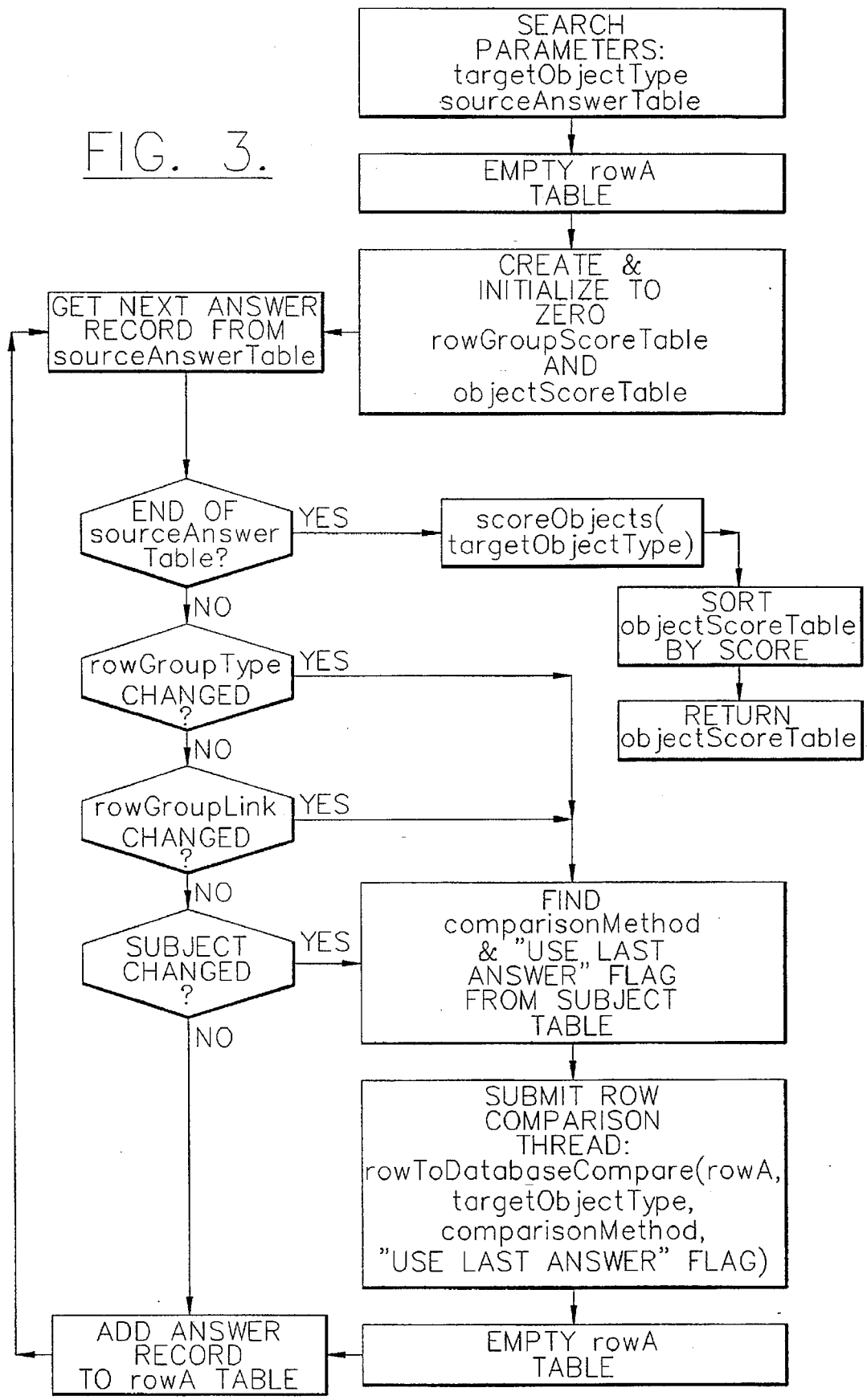
FIG. 3 is a flow diagram illustrating the process of a search of the database in accordance with the present invention.

Referring now to FIG. 3, search is the calculation of the degree of similarity between a structured description (the source) and a set of object descriptions stored in the database (the target). A structured description is simply a complete or partial object description. The database holds the structured descriptions of all objects defined to the system.

Figure 4:
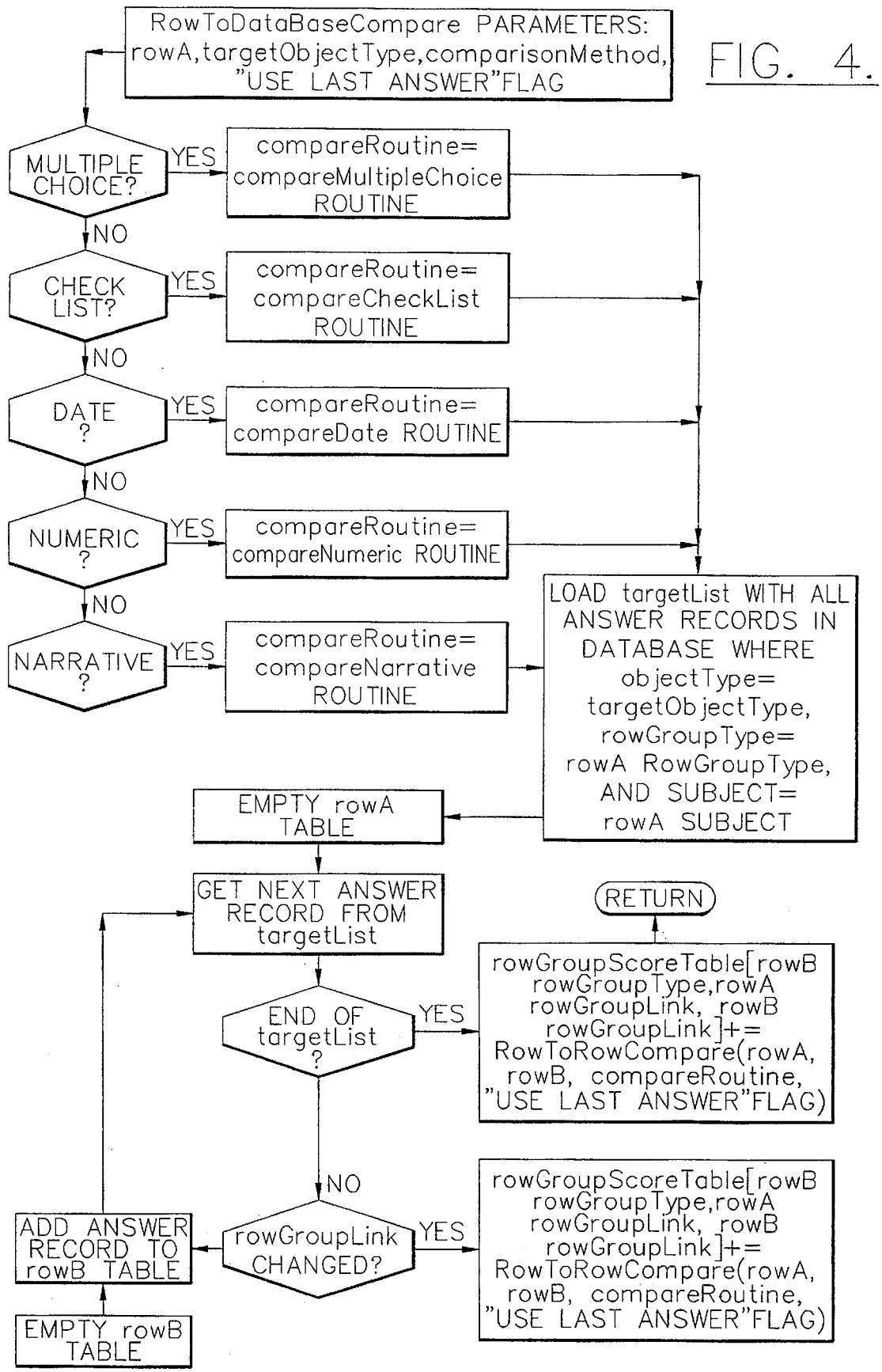
FIG. 4 is a flow chart illustrating the comparison of rowA with corresponding answers in the database.

All subjects (rows) in the source may be compared to their corresponding subjects (rows) in the database simultaneously, see FIGS. 3 and 4. This allows the search to efficiently use multiple processors.

The questions, subject titles, and pre-specified possible answers (as found in check list and multiple choice questions) are language-specific. A separate question record must be built for each subject for each desired language. All questions, subject titles, and possible answers for a particular subject must translate to the same meaning for the invention to function properly.

Each possible answer for check list or multiple choice questions is assigned an answer tag which is unique for the corresponding subject. By having all answers for a particular answer tag (for a particular subject) translate to the same meaning, and storing the answer tag rather than the answer in the answer table, comparisons will be independent of the language used by the observer. Distinguishing answers by their order is the same as using tags where the value of the tag equals the order (position) of the answer. However, it is best to not use the answer's position as its tag because it may be desirable to change the order at a later date.

Answer tags also reduce memory usage, in the computer selected, by replacing a text answer with a number. By reducing the physical size of the answer table, searches involve moving less information and comparisons are faster (a simple numeric comparison replaces a variable-length string comparison).

A subject is a language-independent attribute of a row group (or component). The subject title, which is language specific, is stored in the question table. For example, a car may have the attribute of color (ignoring for now the possibility of multi-colored autos). In English, the subject name might be "automobile color," the question "What is the cat's color?" and the possible answers might be "white, yellow, red, brown, black, other." This subject name, question, and possible answers may be translated to a number of other languages, but the idea of a car having the attribute of color, which is the subject, is independent of language.

In the above example, yellow could be assigned a tag of 2. Then, every translation of this possible answer (yellow) should also be assigned the tag 2. No other answer for this subject may then use this tag.

Figure 7:
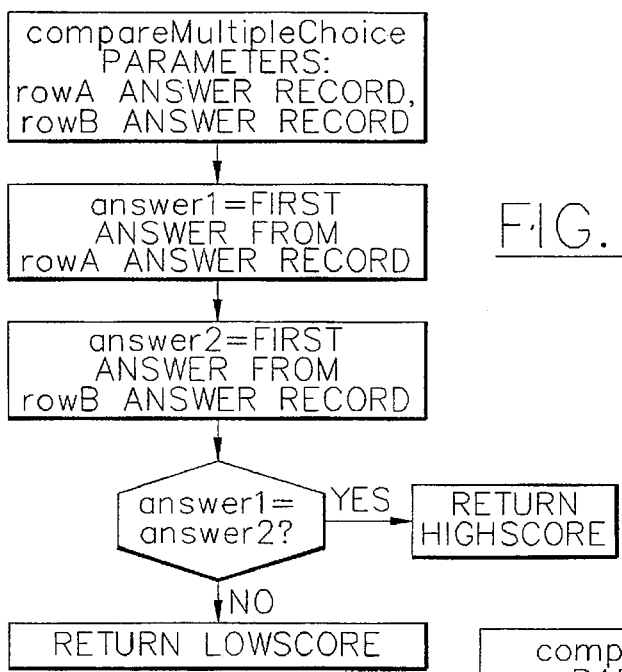
FIG. 7 is a flow chart illustrating how answers for multiple choice questions are compared.
Figure 8:
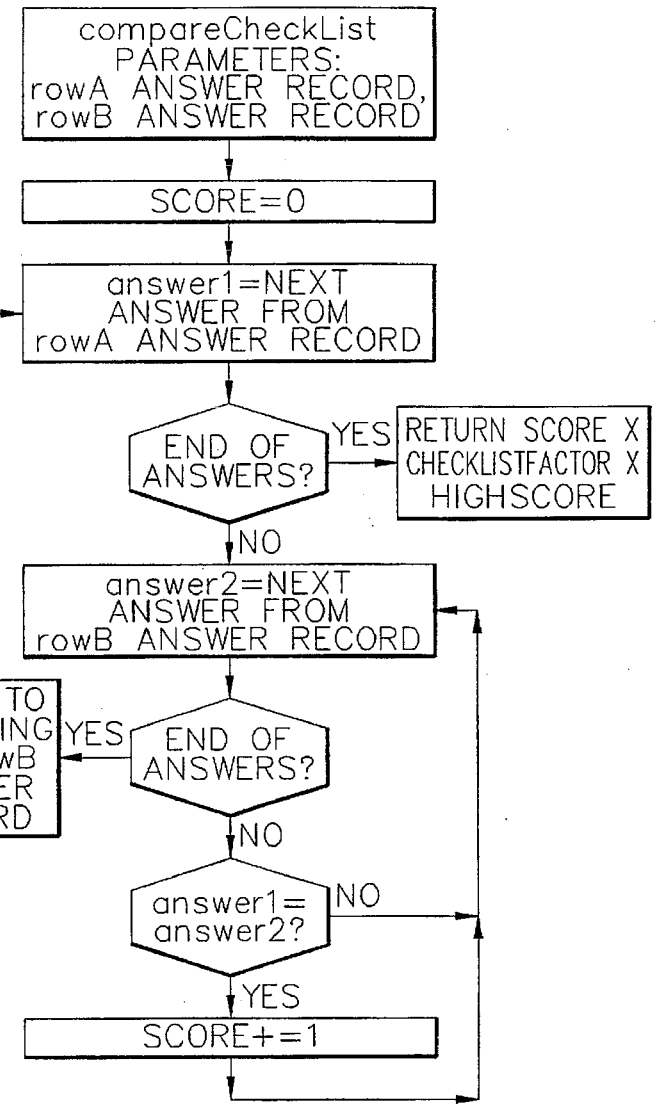
FIG. 8 is a flow chart illustrating how answers for check list questions are compared.
Figure 9:
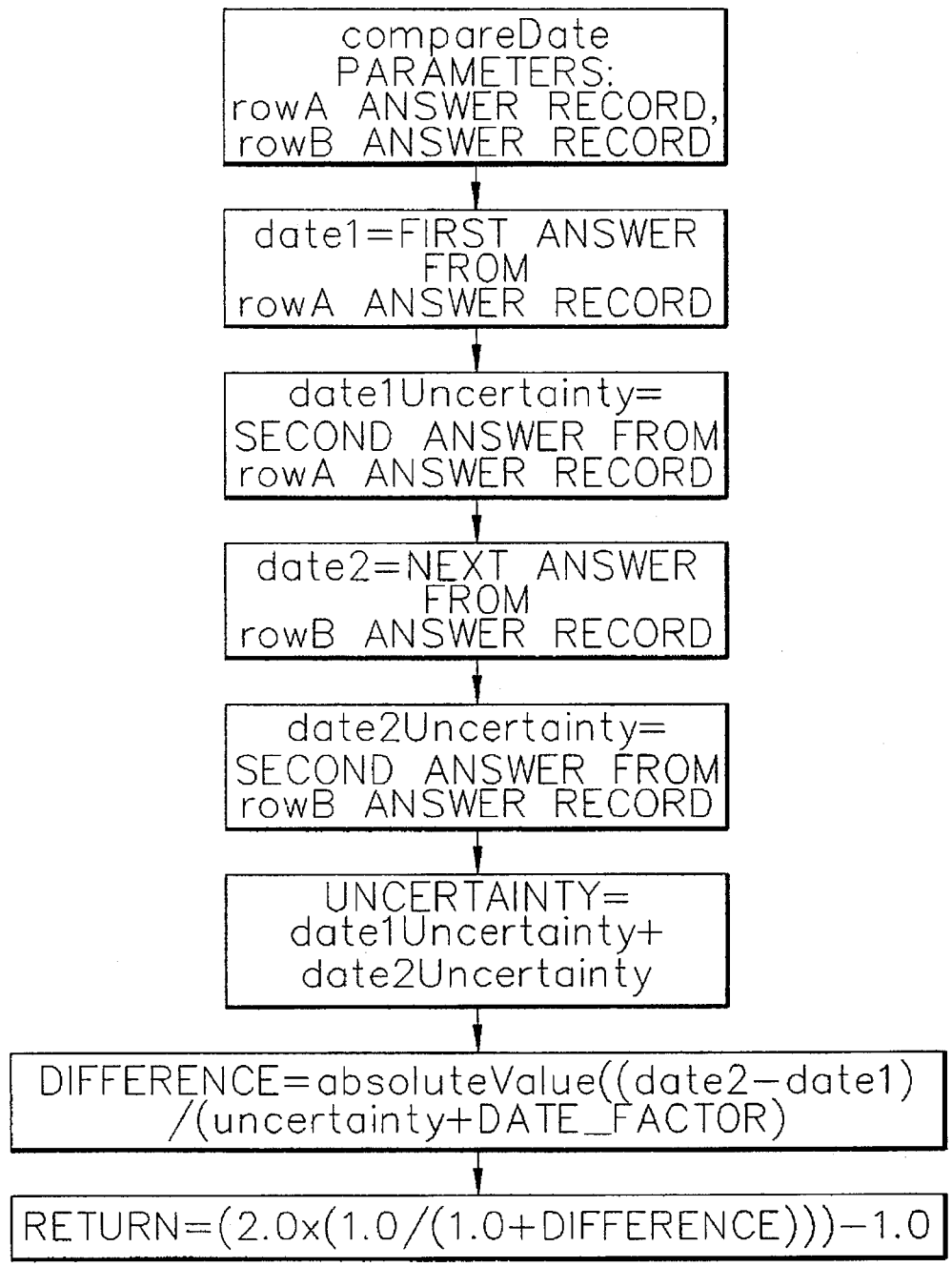
FIG. 9 is a flow chart illustrating how dates are compared.

Referring to FIGS. 7 and 8, multiple choice, ordered multiple choice and check list questions allow the user to select one of a finite number of answers. Normally "other" is provided as a choice to cover unusual situations. "Unknown" is also normally a choice, but if this is selected, nothing is written to the database (this is the same as not answering the question).

With multiple choice, selecting one answer implies the other answers are not true. The question, "What sex is the pilot?", is a multiple choice question with two possible answers. Selecting "female" implies the pilot is not male.

Check list questions allow for the collection of a large amount of data but at the cost of reduced control. In the example above, if the observer did not select female, the check list question does not allow the conclusion that the pilot is not female, just that the observer could not tell if the pilot was female or not. In other words, check list questions should be used when the possible answers are not mutually exclusive.

When answers fall into a natural order, from small to large, thin to fat, or cold to hot, the ordered multiple choice question type should be used. It appears as a multiple choice question (only one choice is allowed) but it is scored with a step function rather than a binary function.

Figure 10:
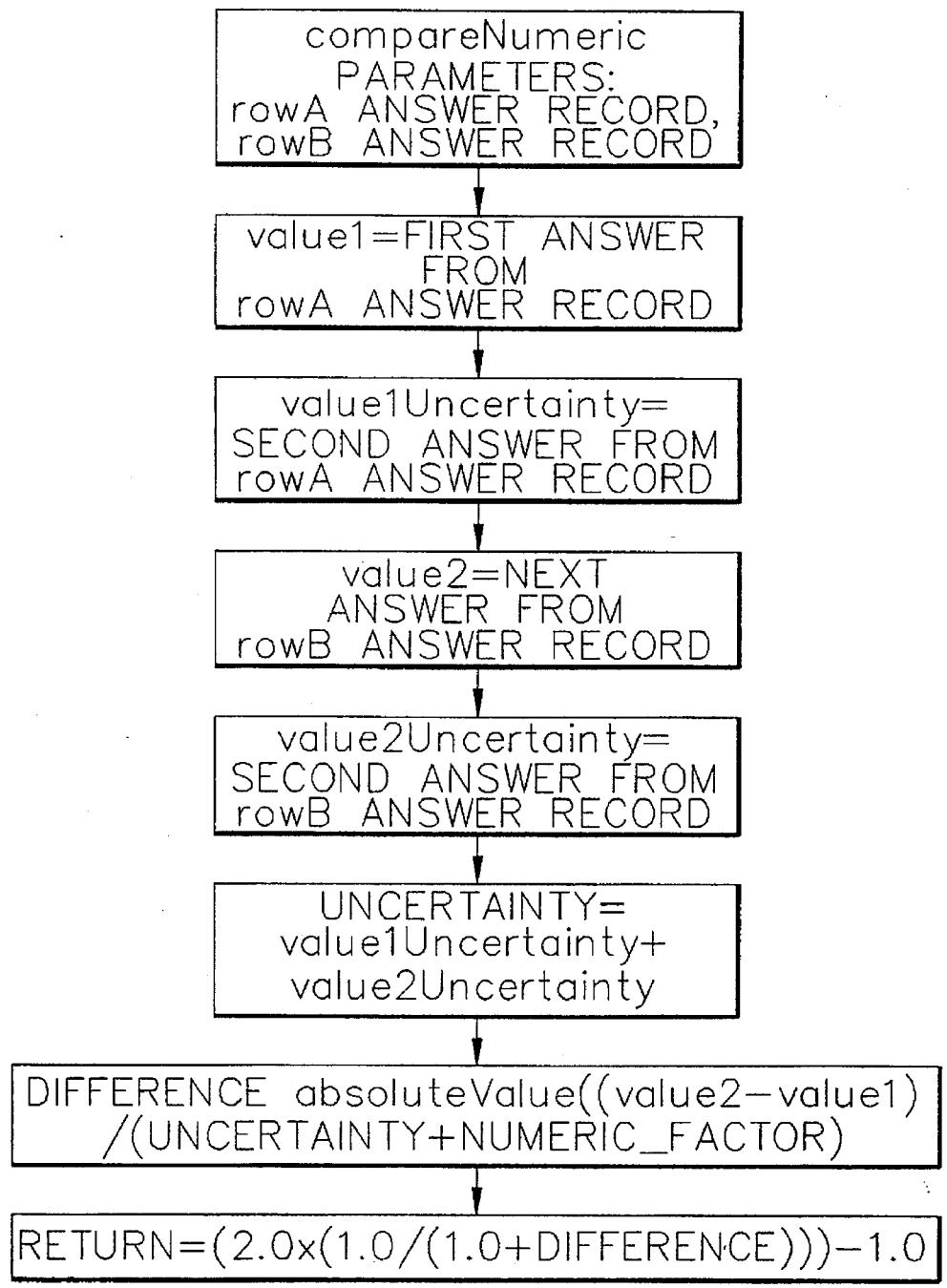
FIG. 10 is a flow chart illustrating how numeric answers are compared.

Numeric answers, as shown in FIG. 10, are naturally language independent except for their units and associated system of measurement. Whenever a unit is provided with a numeric answer, it must be matched with a corresponding entry in the unit table. This unit table must be defined for every language the system is expected to handle. The entry in the table must specify the system of measurement, such as metric or U.S. customary, the unit belongs to and a conversion factor to a standard internal unit and system of measurement. By converting all numeric values to a standard internal unit and system of measurement, all comparisons will be valid.

Multiple choice to numeric questions are the types of questions that have a pre-defined, finite set of numeric answers. Here tags are not used, but rather the possible answers must be pre-translated to ensure that units are shown in the language desired. However, once an answer has been selected it is handled as a numeric answer, as described above.

Narrative answers, as shown in FIG. 11, must exist in a common language for both the source and target of any comparison. If a common language is not available then a neutral score is assigned. Language independence, which is automatic for all but narrative answers, allows observers to record their answers in their native tongue.

It is important to note that performance of the system of the present invention is improved if the scope of the search is restricted. There are several ways that this may be accomplished. When a search is requested, the object type to be searched must be provided. Since answers are ordered object type, searches will only scan that portion of the database. That is, the search can be restricted to a particular object type. Further, the search can be restricted to only row groups (components) of the same type. If, for example, cars and planes were components of the transportation vehicle's object type, and a search was submitted that only included the description of the car, then the search would not scan any records that involved the description of planes. This is a result of having row group (component) type be the second field in the answer table primary key.

The search can further be restricted by comparing answers for only when they exist for both the source and the target object. When comparing two objects, only answers for subjects that are common to both are scored in this scenario. No processing normally results if either object contains a subject that the other is missing. This is a result of defining a neutral score as zero. If, for example, the goal was to identify an individual using, in part, an observation that the individual's height was between 70 and 72 cm, then all answer records for object type=individual and component type=physical description and subject=height would be compared to the range 70 to 72 cm. In any storage system where retrieval time was address-dependent, this organizational structure minimizes retrieval time, since all the answer records for this comparison are stored in adjacent locations.

By including component link and observation (statement) number in the order, the system optionally can provide additional control over comparison results. Including component link facilitates scoring by simplifying the task of identifying rows of answers in the database (note rowB in FIG. 4). If the observation number corresponded to the time the observation was reported, it would be possible to ignore scoring all but the last (most recent) observation. (See FIG. 5.)

An object of the system of the present invention is to provide a numeric value specifying the degree to which each object matches the source description. That is, this system compares a description of an object (by comparing the answers for all of its components) to all other objects (via their components) of a particular object type. It is important to note that the source and target object types do not have to be the same.

Scoring is accomplished on four levels:

1. compare individual answer cells;
2. compare individual rows of answer cells;
3. compare individual row-groups (groups of rows); and
4. compare individual objects (multiple row groups).

To determine the degree of similarity between any single object and the rest of the objects known to the system, i.e., included in the database, each of the components must be compared. To compare a component, each description of that component must be compared with corresponding descriptions of other components. All component descriptions (for that object type and component type) which have the same subject link may be compared.

A single comparison between two descriptions (rows) is performed according to the type of answer. The subject record, obtained using the subject link, includes the answer type. Each comparison results in a numeric result ranging from highscore to lowscore. (highscore+lowscore)/2 is a neutral score, which normally only occurs when the target component does not contain a subject in common with the source. A comparison of numeric values, for example, may also result in a neutral score. Useful values for highscore, neutralscore, and lowscore are +1, 0, and −1, respectively. A zero neutralscore will save substantial processing time and is assumed in this document.

While other indexing methods may be used, it has been found easiest to number components for a given object and component type from 1 to n, where n is the total number of components. Then, when comparing a component to the n−1 other components in the system for the same object and component type, a single buffer capable of holding n scores must be allocated.

Since data is organized by subject (within object and component type), comparisons are made in subject order. If the source component contains k subjects, then k parallel comparison streams may be made (one for each subject). The following chart illustrates the situation. The result of a comparison of individual answer cells is a numeric score. It is at this level that a numeric score is actually calculated (or assigned.) Actual score calculation depends upon the question type (multiple choice, check list, narrative, etc.). A variety of scoring methods may be used, and simply are intended to provide a mathematical basis for the score calculation. For example, the scoring methods below may be used:

| Question Type | Scoring Method |
| --- | --- |
| multiple choice | multiple choice is scored on a discrete basis: if equal score = = high score; if not equal score = = − high score |
| ordered multiple choice | score = high score − dist. from match x $\frac{2 * \text{high score}}{\text{x of choices} - 1}$ where dist. from match = absolute value of the difference between the tag (or realtive position) of source and target answers. |
| check list | score = (factor 1)x # of matching choices x high score where 0 < factor 1 < = 1. |

Normally check list questions do not allow the observer to indicate a "no" or "not present" choice. For example, if asked to check all locations where a car had dents, there is no distinction between the observer knowing that the car had no dents and the observer not knowing because he or she had not seen the entire car.

Comparing multiple choice to numeric questions is scored as a numeric question. While the question is asked in multiple choice format, the possible answers are numeric and they are stored as numeric answers.

Numeric scoring uses an equation which is monotonically increasing as the source and target answers approach equality. With narrative answers, the percentage of words from the source that are found in the target provides the basis for calculating a numeric score. A table of words to not score, such as "a," "the," "with," etc., may be defined.

Each observer can also be allowed to specify their uncertainty, or reciprocally, the degree of confidence in the answers they give. The score calculated above is then multiplied by the "confidence" factor. Further, numeric answers normally have an uncertainty associated with them. This uncertainty is used in the narrative score calculation.

Referring now to FIGS. 12 and 13 by way of illustration, the steps involved in comparing an object with three suspects and two weapons (two rowGroup types, and five rowGroup links) against an object in the database with two suspects and three weapons is shown.

In this example, the objects represent a crime and the rowGroups are the suspects and weapons involved in the crime.

As illustrated in FIG. 12, the rowGroup table may have several entries for a particular objectLink. Object type, which is part of the rowGroup table but is not shown, equals the type of object selected for searching. In this example, the rowGroup table provides two lists of rowGroup links: List A for the rowGroupLinks which belong to rowGroup Type 5 (9, 10, and 12) and list B for the rowGroupLinks which belong to rowGroupType 20 (5 and 8.) The rowGroupScore table has rows for each rowGroupLink in the sourceAnswer table (the search criteria). These rows are grouped by the rowGroupType.

In the portion of the rowGroupScore table where the rowGroupType=20, the columns for the rowGroupLinks equal 5 and 8 provide the scores for matching these rowGroups with the rowGroups (suspects 1 through 3) in the sourceAnswer table. There are only two rowGroupLinks in list B (object 15, rowGroupType 20), even though the sourceAnswer table includes three suspects. The score for any single rowGroupLink may not be added to an object's total score more than once. Within this restriction, the highest scores are used. This means that object 15 will only add in the scores for the best two matches, which is suspect 2 vs component 8 (score 0.6) and suspect 1 vs component 5 (score 0.5).

In the lower portion of the rowGroup table in FIG. 13 where rowGroupType=5 (weapon), the columns for rowGroupLinks=9, 10, and 12 provide the scores from matching these rowGroups with the rowGroups (weapon 1 and 2) in the sourceAnswer table. Since there are three rowGroupLinks in list B (object 15, rowGroupType 5), the sourceAnswer table only includes two weapons. This means that object 15 will only add in the scores for the best two matches, which is weapon 1 vs component 10 (score 0.5) and weapon 1 vs component 12 (score 0.3). The final score for object 15 is found by adding the individual scores together as shown in FIG. 13. The final score, therefore, is 0.5+0.6+0.5+0.3 or 1.9.

In summary, the present invention allows one to define object types and components that compose these object types and their components may be redefined for different applications. In the investigative example, object types might include crimes, offenders, and victims. The present invention deals with instances of object types, such as the assassination of President Kennedy (a crime), Lee Harvey Oswald (an offender), and President Kennedy (a victim). As noted above, objects consist of one or more components. Components of a crime object would include physical descriptions (one for each suspect), weapons, offenses, and vehicles. A component type may cross object types, that is, more than one object can contain instances of a single component type. For example, the physical description component type would apply both to a crime object and an offender object. In the first case, it would be used to describe a suspect, while in the second it would describe a known offender.

Just as objects contain components, components are themselves divided into subjects. A subject is a unit or attribute of an object. Returning to our example, for the physical description component above, subjects might include height, weight, and sex. Examples (or instances) of each subject include 6 feet (a height), 175 pounds (a weight), and male (a sex). These instances of subjects are known as answers.

The storage of objects, components, subjects, and answers is critical. A term for describing where the answers are stored is required. For the purposes herein, "database" refers to this storage place.

An important aspect of the present invention is that it incorporates the idea of multiple answers for each subject. This is accomplished by the addition of another construct called a statement. A statement is the set of answers provided by a single observer and added to the database at a single time. An observer may give additional data later, but this data will by definition comprise a new statement. Additional observers may add their own statements to the database. A model that is useful for representing this structure is a matrix (see FIGS. 1, 2, 12, and 13). With a matrix, the subjects could be represented by rows and statements represented by columns. The answers for each subject and statement can be found at the appropriate subject/statement (or row/column) intersection.

When the term row is used below, it refers to all the answers for a given subject within a component. In the matrix example, it is easy to see that having more than one statement could lead to more than one answer for the same subject. These answers may differ, so while one answer for the weight subject might be 150 pounds, another might indicate 165 pounds. Since these answers apply to the same subject but belong to different statements, they are said to be on the same row.

Before the present invention can be applied to a particular problem, one must select what types of objects and components comprise the system. Additionally, subjects must be determined in advance. In the example involving police detectives, the object types mentioned above—crimes, offenders, and victims—would be enumerated. Then these object types may be used to differentiate different objects in the system. Next, component types must be enumerated similarly. In our example we have four component types—physical descriptions, weapons, offenses, and vehicles. Finally, each subject must be created. Subjects are also enumerated. In our physical description example, we would have the subject's height, weight, and sex. Subjects are all identified by a unique number, or subject link, within the component type that they describe.

To minimize the time and space required by the present invention, a unique storage structure is adopted. As seen above, an answer belongs to a particular subject of a particular component of a particular object. As each object instance is added to the database, it is assigned a number that, along with the object type, uniquely identifies the object in the database. This number is called a link. Because it applies to an object, it is called an object link. Similarly, each component is also assigned a number, or component link, which, along with its component type, uniquely identifies it within the database. Each new statement is also assigned an identifying number, or statement link. However, the statement's link is only uniquely identified within the object that they describe. Of most concern is the manner in which answers are stored. The primary key for storing answers is defined as:
  object type
  component type
  subject
  component link
  statement link This organization is highly efficient because of the structure used to represent the data. It groups all the answers pertaining to a specific object type and component type in a localized block on the database that can be read sequentially. Component type may be left out of the key for the special case where no subject is shared by two or more component types. In the example, all answers describing offenders' heights would be stored in one block; all answers describing suspects' heights would be stored in another block. The reason this structure adds efficiency to the present invention will be seen below.

Another benefit of this organization is that it allows one component to be linked to more than one object. The present invention automatically includes the shared component during comparisons of each object that contains it. For example, if one vehicle had been used to commit more than one crime, the vehicle would only appear in the database once. However, each crime that the vehicle had been used in would contain the vehicle as a component. This allows the vehicle (or component) to be modified once and be reflected automatically in each crime (or object) in the database.

The stated goal of the present invention is to produce a list of objects that are similar to a given set of answers. The list should be sorted based on how similar each object is to the given answers. Comparing a single answer to another results in a score that depends upon the types of questions and the degree to which the two answers differ. There are several different types of answers including multiple choice, check list, text, time and date, and numeric. Answers are scored on how similar one is to another. Each type of answer has its own comparison method for generating scores. There are also provisions for converting between some answer types for cross type comparisons. Complete flowcharts for each comparison method are shown in FIGS. 4–11.

Figure 5:
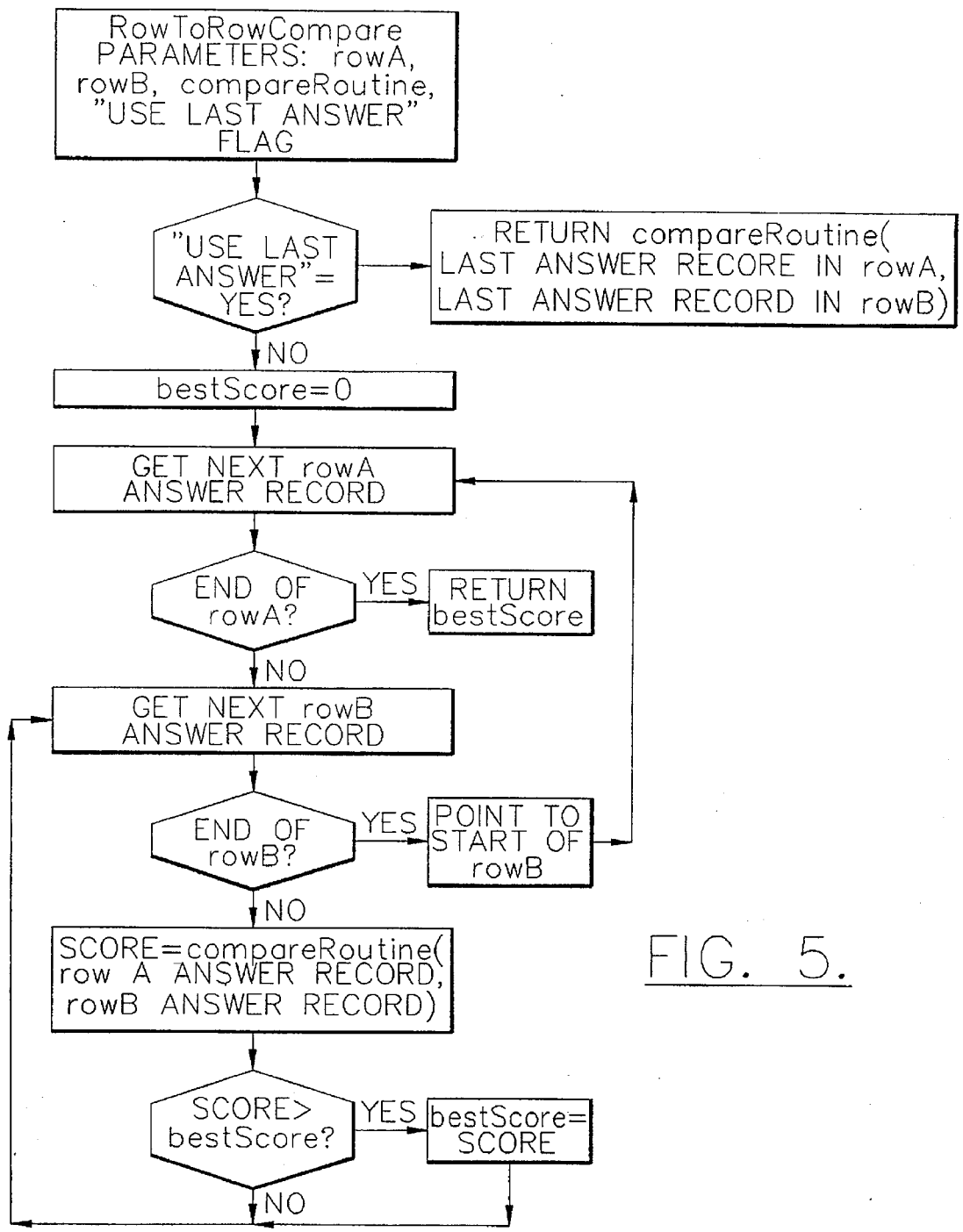
FIG. 5 is a flow chart illustrating the comparison of rowA to rowB where rowB is a subset of the answers in the database from FIG. 4.
Figure 6:
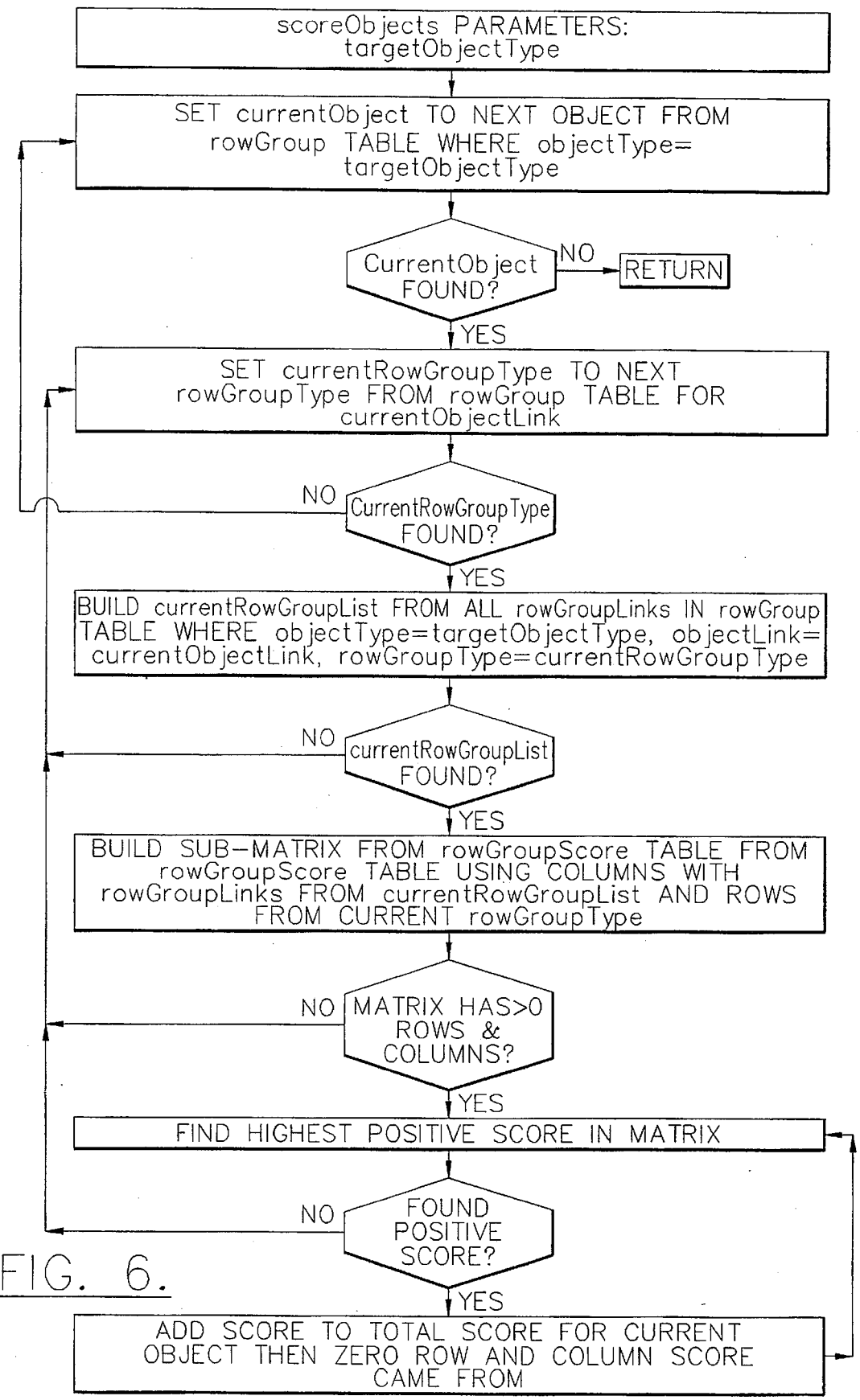
FIG. 6 is a flow chart illustrating how the component scores are totalled into the corresponding object scores.

Rows may contain several, possibly conflicting, answers from one or more observers. Each row addresses a single subject, and only rows for the same subject and component type may be compared. As shown in FIG. 5, when comparing one row to another, each answer on the first row is compared to each answer on the second row. The score for the row comparison is the best score obtained from all these answer comparisons.

The scores for all the rows in each component are totaled, and used to decide which components best match the source components. Two objects being compared will often have a different number of components of the same type. The best scores are totaled into the score of the object being compared. However, no component's score may be used more than once. For example, consider that two perpetrators may commit a robbery together. Later these two individuals may join with two more friends to commit another robbery. When these two crimes (or objects) are compared, the first will have only two physical description components while the second will have four.

Below is a sample table that demonstrates what happens when the two objects described above are compared. The numbers are chose at random and are intended to represent the unnormalized, accumulated scores produced by matching the components of the source (the search criteria) with the components of an object in the database.

|  | Object Being Compared | | | |
| --- | --- | --- | --- | --- |
| Source Object | Component 1 | Component 2 | Component 3 | Component 4 |
| Component A | 1.1 | 7.2 | −6.5 | 1.8 |
| Component B | 2.2 | −5.7 | 4.9 | 3.6 |

Note that the source object has two components, A and B. At the top of the table are the four components of the object being compared. The present invention finds the best scores for the intersection of each row and column in the table, starting with the highest possible scores. Therefore, the present invention first finds the score of 7.2 at intersections of components A and 2, and then finds the score of 4.9 computed from matching components B and 3. Note that no component's score is ever used more than once. When the object being compared has more components than the source object, the extra components' scores are not used. Note that components 1 and 4 are not used in this comparison because their scores are not high enough.

While the present invention has been disclosed in connection with the preferred embodiment thereof, it should be understood that there may be other embodiments which fall within the spirit and scope of the invention as defined by the following claims.

I claim:

1. A method of identifying an unidentified object by producing a list of known objects having attributes similar to the unidentified object, said method comprising the steps of:
    (a) collecting information about at least one attribute of the unidentified object;
    (b) converting the collected attribute information into a language independent format;
    (c) arranging the collected information having a language independent format in a predetermined sequence;
    (d) comparing the language independent collected attribute information with information related to a plurality of known objects, wherein the known objects may include a different number and/or type of attributes than the unidentified object;
    (e) assigning a value to each one of the known objects indicating the degree of similarity each known object has to the unidentified object; and
    (f) providing a list of the known objects most closely matching the observed object based on the assigned similarity values.

2. A method according to claim 1, wherein step (a) comprises collecting attribute information via instrumentation.

3. A method according to claim 1, wherein step (a) comprises collecting attribute information via observations made by one or more persons.

4. A method according to claim 1, wherein step (b) comprises representing the collected information numerically.

5. A method according to claim 4, wherein the information related to a plurality of known objects is represented numerically and stored in a predetermined sequence to facilitate comparison with the collected information.

6. A system for facilitating the identification of an unidentified object by producing a list of known objects having attributes similar to the unidentified object, said system comprising:
    (a) means for collecting information about at least one attribute of the unidentified object;
    (b) means responsive to said information collecting means for converting the collected attribute information into a language independent format;
    (c) means responsive to said converting means for arranging the collected information having a language independent format in a predetermined sequence;
    (d) means for comparing the language independent collected attribute information with information related to a plurality of known objects, wherein the known objects may include a different number and/or type of attributes than the unidentified object;
    (e) means responsive to said comparing means for assigning a value to each one of said known objects indicating the degree of similarity each known object has to the unidentified object; and
    (f) means responsive to said assigning means for providing a list of said known objects most closely matching the observed object based on the assigned similarity values.

7. A system according to claim 6, wherein said means for collecting information about an unidentified object comprises means for collecting information via instrumentation.

8. A system according to claim 6, wherein said means for collecting information about an unidentified object comprises means for collecting information via observations made by one or more persons.

9. A system according to claim 6, wherein said means for converting the collected attribute information into a language independent format comprises means for representing the collected information numerically.

10. A system according to claim 9, further comprising means for numerically representing the information related to a plurality of known objects and for storing said numerical representations in a predetermined sequence to facilitate comparison with the collected information.

* * * * *